3,519,631
QUATERNARY DERIVATIVES OF 1,2,3,4-TETRA-
HYDRO-9-AMINO-ACRIDINE
Walter Ost, Klaus Thomas, and Dietrich Jerchel, Ingelheim am Rhine, Germany, assignors to Boehringer Ingelheim G.m.b.H., Ingelheim am Rhine, Germany, a corporation of Germany
No Drawing. Filed Aug. 16, 1966, Ser. No. 572,664
Claims priority, application Germany, Aug. 18, 1965,
B 83,329, B 83,330
Int. Cl. C07d 37/24
U.S. Cl. 260—279                          15 Claims

ABSTRACT OF THE DISCLOSURE

Bacteriocidal and fungicidal quaternary 1,2,3,4-tetrahydro-9-amino-acridine derivatives of the formula

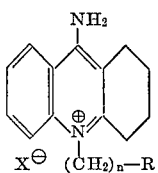

wherein $n$ is an integer from 8 to 16, inclusive,

X is the biologically acceptable anion of an inorganic or organic acid, such as mineral acids, acetic acid, propionic acid, caproic acid, tartaric acid, methanesulfonic acid, fumaric acid, maleic acid, citric acid or p-toluenesulfonic acid, and R is hydrogen or

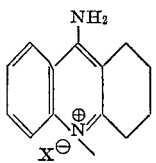

where X has the same meanings as defined above.

---

This invention relates to novel quaternary derivatives of 1,2,3,4,-tetrahydro-9-amino-acridine, as well as to various methods of preparing these compounds.

More particularly, the present invention relates to novel quaternary 1,2,3,4-tetrahydro-9-amino-acridine derivatives of the formula

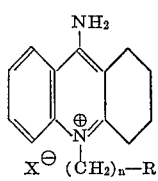

wherein $n$ is an integer from 8 to 16, inclusive,

X is the biologically acceptable anion of an inorganic or organic acid, such as mineral acids, acetic acid, propionic acid, caproic acid, tartaric acid, methanesulfonic acid, fumaric acid, maleic acid, citric acid or p-toluenesulfonic acid, and R is hydrogen or

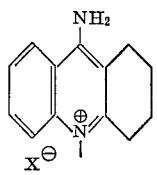

where X has the same meanings as defined above.

The compounds according to the present invention may be prepared by various methods involving known chemical principles; among these, the following methods have proved to be particularly convenient and efficient:

*Method A.*—For the preparation of a compound of the Formula I wherein R is hydrogen, by reacting 1,2,3,4-tetrahydro-9-amino-acridine with an alkyl compound of the formula

            (II)

wherein $n$ has the same meanings as in Formula I, and

Y is a substituent capable of being split off as an anion, especially halogen or p-toluenesulfonyl; bromine and iodine are preferred as halogens.

The reaction is advantageously carried out in the presence of an inert organic solvent, such as methyl ethyl ketone, nitrobenzene, dimethyl formamide, butanol, pentanol, benzyl alcohol, chlorobenzene, cyclohexanone or benzonitrile and at elevated temperatures, preferably the boiling point of the particular solvent. However, it may also be performed by heating a mixture of the two reactants to a temperature from 100 to 250° C. without a solvent.

*Method B.*—For the preparation of a compound of the Formula I wherein R is a 1,2,3,4-tetrahydro-9-amino-acridinium radical, by reacting an ω,ω'-disubstituted alkane of the formula

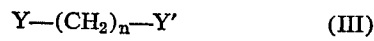            (III)

wherein

Y and Y', which may be identical to or different from each other, are substituents capable of being split off as anions, especially halogen or p-toluenesulfonyl, and $n$ has the same meanings as in Formula I, with 1,2,3,4-tetrahydro-9-amino-acridine.

The reaction is carried out under the same conditions as that described under method A.

Any particular anion X in a compound of the Formula I may be exchanged for another anion comprised in the above definition of X by double decomposition with a metal salt, preferably a silver salt in the presence of an inert solvent. For instance, if X in Formula I is a bromide ion, it may be exchanged for an acetate ion by subjecting the acridinium bromide to a double decomposition reaction with silver acetate.

The 1,2,3,4-tetrahydro-9-amino-acridine required as a starting material in methods A and B above may itself be prepared by the method of J. A. Moore, Tetrahedron Letters 20, 1277 (1963), from anthranilic acid amide and cyclohexanone.

The following examples illustrate the present invention and will enable others skilled in the art to understand it more completely. It should be understood, however, that the invention is not limited to the particular examples given below.

EXAMPLE 1

Preparation of N-octyl-1,2,3,4-tetrahydro-9-amino-acridinium bromide by Method A 4 gm. of 1,2,3,4-tetrahydro-9-amino-acridine were admixed with 3.9 gm. of 1-bromo-octane, and the mixture was heated slowly. At 150–155° C. a clear fused mass formed which soon solidified. The solidified mass was cooled and was then comminuted into a powder. The powder was first washed with acetone and then recrystallized from ethanol. 4.75 gm. (60% of theory) of N-octyl-1,2,3,4-tetrahydro - 9 - amino-acridinium bromide, M.P. 294–296° C. (decomposition), of the formula

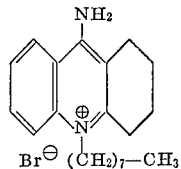

were obtained.

EXAMPLE 2

Preparation of N-octyl-1,2,3,4-tetrahydro-9-amino-acridinium chloride by Method A A mixture of 4 gm. of 1,2,3,4-tetrahydro-9-amino-acridine and 4.5 gm. of 1-chloro-octane (50% stoichiometric excess) was heated as described in Example 1. A clear fused mass was formed at 200° C. After the mass had solidified it was cooled, powdered, washed with acetone and recrystallized from aqueous 50% ethanol, 2.6 gm. (38% of theory) of N-octyl-1,2,3,4-tetrahydro-9-amino-acridinium chloride, M.P. 305–306° C. (decomposition), were obtained.

EXAMPLE 3

Preparation of N-decyl-1,2,3,4-tetrahydro-9-amino-acridinium bromide by Method A A solution of 1.98 gm. of 1,2,3,4-tetrahydro-9-amino-acridine and 2.21 gm. of 1-bromo-decane in 30 cc. of butanol was refluxed for ten hours. Thereafter, the precipitate which had separated out was collected by vacuum filtration, and the filter cake was washed with acetone and was then recrystallized from a mixture of isopropanol and ethanol (5:1). 3.0 gm. (71% of theory) of N-decyl-1,2,3,4-tetrahydro-9-amino-acridinium bromide, M.P. 285–288° C. (decomposition), of the formula

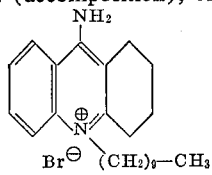

were obtained.

EXAMPLE 4

Using a procedure analogous to that described in Example 1, N-decyl-1,2,3,4-tetrahydro-9-amino-acridinium bromide, M.P. 285–288° C. (decomposition), was prepared by fusing a mixture of 1.98 gm. of 1,2,3,4-tetrahydro-9-amino-acridine and 2.21 gm. of 1-bromo-decane. The yield was 3.2 gm. (76% of theory).

EXAMPLE 5

Preparation of N-decyl-1,2,3,4-tetrahydro-9-amino-acridinium salicylate from the corresponding acridinium bromide by double decomposition A solution of 1 gm. of N-decyl-1,2,3,4-tetrahydro-9-amino-acridinium bromide and 0.5 gm. of silver salicylate in 20 cc. of methanol was refluxed for two hours. The insoluble silver bromide formed thereby was collected by vacuum filtration, and the filtrate was evaporated to dryness. The residue was recrystallized from acetone, yielding 60% of theory of N-decyl-1,2,3,4-tetrahydro-9-amino-acridinium salicylate, M.P. 187–189° C.

EXAMPLE 6

Using a procedure analogous to that described in Example 5, N-decyl-1,2,3,4-tetrahydro-9-amino-acridinium lactate, M.P. 241–243° C. (recrystallized from ethanol/acetone), was prepared from N-decyl-1,2,3,4-tetrahydro-9-amino-acridinium bromide and silver lactate. The yield was 62% of theory.

EXAMPLE 7

Using a procedure analogous to that described in Example 5, N-decyl-1,2,3,4-tetrahydro-9-amino-acridinium dihydrogencitrate, M.P. 180–181° C. (recrystallized from ethanol/acetone), was prepared from N-decyl-1,2,3,4-tetrahydro-9-amino-acridinium bromide and silver dihydrogencitrate. The yield was 59% of theory.

EXAMPLE 8

Using a procedure analogous to that described in Example 5, N-decyl-1,2,3,4-tetrahydro-9-amino-acridinium disodiumcitrate, M.P. 162–165° C. (recrystallized from ethanol/acetone), was prepared from N-decyl-1,2,3,4-tetrahydro-9-amino-acridinium bromide and silver disodiumcitrate. The yield was 60% of theory.

The silver disodiumcitrate was obtained by reacting trisodium citrate with 1 mol equivalent of silver nitrate in water.

EXAMPLE 9

Using a procedure analogous to that described in Example 5, N-decyl-1,2,3,4-tetrahydro-9-amino-acridinium isethionate, M.P. 173–175° C. (recrystallized from acetone), was prepared from N-decyl-1,2,3,4-tetrahydro-9-amino-acridinium bromide and silver 2-hydroxy-ethane-sulfonate. The yield was 63% of theory.

In contrast to the products obtained in Examples 3 through 8, the isethionate was freely soluble in water.

EXAMPLE 10

Using a procedure analogous to that described in Example 1, N-dodecyl-1,2,3,4-tetrahydro-9-amino-acridinium bromide, M.P. 284–286° C. (recrystallized from ethanol), was prepared from 4 gm. of 1,2,3,4-tetrahydro-9-amino-acridine and 5 gm. of 1-bromo-dodecane. The yield was 5.1 gm. (57% of theory).

EXAMPLE 11

Preparation of N-dodecyl-1,2,3,4-tetrahydro-9-amino-acridinium bromide by Method A A solution of 4 gm. of 1,2,3,4-tetrahydro-9-amino-acridine and 5 gm. of 1-bromo-dodecane in 50 cc. of nitrobenzene was heated for 24 hours at 140–150° C. Thereafter, the precipitate formed thereby was collected, washed with ether and recrystallized from ethanol. 5.0 gm. (56% of theory) of N-dodecyl-1,2,3,4-tetrahydro-9-amino-acridinium bromide were obtained.

EXAMPLE 12

Preparation of N-dodecyl-1,2,3,4-tetrahydro-9-amino-acridinium acetate by double decomposition A solution of 1.6 gm. of N-dodecyl-1,2,3,4-tetrahydro-9-amino-acridinium bromide and 0.595 gm. of silver acetate in 20 cc. of methanol was stirred for six hours at room temperature under exclusion of light. Thereafter, the precipitated silver bromide was filtered off, and the filtrate was evaporated. The residue was recrystallized from acetone. 65% of theory of N-dodecyl-1,2,3,4-tetrahydro-9-amino-acridinium acetate was obtained in the form of colorless needles having a melting point of 148–151° C.

The same results were obtained when lead acetate was used in place of silver acetate.

EXAMPLE 13

Using a procedure analogous to that described in Example 1, N-dodecyl-1,2,3,4-tetrahydro-9-amino-acridinium chloride, M.P. 255–258° C. (decomposition) after recrystallization from aqueous 50% ethanol, was prepared by heating a mixture of 4 gm. of 1,2,3,4-tetrahydro-9-amino-acridine and 6.2 gm. of 1-chloro-dodecane (50% stoichiometric excess) to 190° C. The yield was 2.3 gm. (28% of theory).

EXAMPLE 14

Preparation of N-dodecyl-1,2,3,4-tetrahydro-9-amino-acridinium p-toluenesulfonate by Method A A mixture of 2 gm. of 1,2,3,4-tetrahydro-9-amino-acridine and 3.4 gm. of dodecyl p-toluenesulfonate was heated at 100° C. for six hours. The reaction mixture was then cooled and extracted with warm benzene. The residue was recrystallized from chloroform, yielding 2.4 gm. (44% of theory) of N-dodecyl-1,2,3,4-tetrahydro-9-amino-acridinium p-toluenesulfonate, M.P. 224–226° C.

EXAMPLE 15

Using a procedure analogous to that described in Example 12, N-dodecyl-1,2,3,4-tetrahydro-9-amino-acridinium sorbate, M.P. 166–168° C. (recrystallized from acetone), was prepared from 1 gm. of N-dodecyl-1,2,3,4-tetrahydro-9-amino-acridinium bromide and 0.5 gm. of silver sorbate. The yield was 57% of theory.

EXAMPLE 16

Using a procedure analogous to that described in Example 1, N-hexadecyl-1,2,3,4-tetrahydro-9-amino-acridinium bromide, M.P. 247–249° C. (decomposition) after recrystallization from ethanol, was prepared by heating a mixture of 4 gm. of 1,2,3,4-tetrahydro-9-amino-acridine and 6.1 gm. of 1-bromo-hexadecane to 170° C. The yield was 6.25 gm. (62% of theory).

EXAMPLE 17

Preparation of N,N'-octyl-1,8-bis-(1,2,3,4-tetrahydro-9-amino-acridinium) diiodide by Method B A solution of 10 gm. of 1,2,3,4-tetrahydro-9-amino-acridine and 9.2 gm. of 1,8-diiodo-octane in 100 cc. of methyl ethyl ketone was refluxed for 65 hours. The precipitate formed thereby was collected by vacuum filtration and was then recrystallized from 150 cc. of aqueous 90% ethanol. 8.5 gm. (44% of theory) of N,N'-octyl-1,8-bis-(1,2,3,4-tetrahydro-9-amino-acridinium) diiodide, M.P. 305–306° C. (decomposition), of the formula

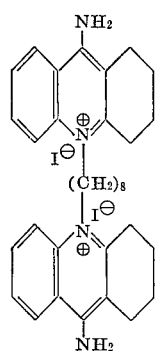

were obtained.

EXAMPLE 18

Preparation of N,N'-decyl-1,10-bis-(1,2,3,4-tetrahydro-9-amino-acridinium) diiodide by Method B A solution of 2 gm. of 1,2,3,4-tetrahydro-9-amino-acridine and 2 gm. of 1,10-diiodo-decane in 30 cc. of methyl ethyl ketone was refluxed for 24 hours. Thereafter, the yellow precipitate which had formed was collected by vacuum filtration, washed with acetone and recrystallized from a mixture of methanol and water (20:1). 1.9 gm. (48% of theory) of N,N'-decyl-1,10-bis-(1,2,3,4-tetrahydro-9-amino-acridinium) diiodide, M.P. 295° C. (decomposition), were obtained.

EXAMPLE 19

Preparation of N,N'-decyl-1,10-bis-(1,2,3,4-tetrahydro-9-amino-acridinium) dibromide by Method B 16 gm. of 1,2,3,4-tetrahydro-9-amino-acridine were admixed with 12 gm. of 1,10-dibromo-decane, and the mixture was heated slowly on an oil bath. When the temperature of the oil bath reached 145° C. a clear melt formed which solidified again when the bath reached 150° C. At this point heating was discontinued, and the reaction mass was cooled, comminuted to a powder, washed with ethanol and recrystallized from aqueous ethanol. 20.5 gm. (73% of theory) of N,N'-decyl-1,10-bis-(1,2,3,4-tetrahydro-9-amino-acridinium) dibromide, M.P. 329–330° C. (decomposition), were obtained.

EXAMPLE 20

Preparation of N,N'-decyl-1,10-bis-(1,2,3,4-tetrahydro-9-amino-acridinium) diacetate by double decomposition A solution of 1.6 gm. of N,N'-decyl-1,10-bis-(1,2,3,4-tetrahydro-9-amino-acridinium) dibromide and 0.765 gm. of silver acetate in 20 cc. of methanol was stirred for 5 hours at room temperature under exclusion of light. Thereafter, the silver bromide which had separated out was filtered off, the filtrate was evaporated, and the residue was recrystallized from isopropanol. The product had a melting point of 267–270° C. (decomposition) and was identified to be N,N'-decyl-1,10-bis-(1,2,3,4-tetrahydro-9-amino-acridinium) diacetate.

EXAMPLE 21

Preparation of N,N'-decyl-1,10-bis-(1,2,3,4-tetrahydro-9-amino-acridinium) dichloride by Method B A solution of 9.9 gm. of 1,2,3,4-tetrahydro-9-amino-acridine and 5.25 gm. of 1,10-dichloro-decane in 100 cc. of dimethylformamide was refluxed for 24 hours. Thereafter, the precipitate which had formed was separated by vacuum filtration, and the filter cake was washed with acetone, dried, and recrystallized from aqueous ethanol. 2.3 gm. (15% of theory) of N,N'-decyl-1,10-bis-(1,2,3,4-tetrahydro-9-amino-acridinium) dichloride, M.P. 342–344° C. (decomposition), were obtained.

EXAMPLE 22

19.8 gm. of 1,2,3,4-tetrahydro-9-amino-acridine were admixed with 10.5 gm. of 1,10-dichloro-decane, and the mixture was slowly heated while stirring. A clear melt was formed when the temperature of the mixture reached 160–170° C., and it solidified again as the temperature reached 200–210° C. The mass was maintained at 200° C. for 15 minutes, and was then cooled, comminuted to a powder and recrystallized from aqueous ethanol. 13.0 gm. (43% of theory) of N,N'-decyl-1,10-bis-(1,2,3,4-tetrahydro-9-amino-acridinium) dichloride were obtained.

EXAMPLE 23

Preparation of N,N'-decyl-1,10-bis-(1,2,3,4-tetrahydro-9-amino-acridinium) di-p-toluenesulfonate by Method B A mixture of 4 gm. of 1,2,3,4-tetrahydro-9-amino-acridine and 4.8 gm. of 1,10-bis-(p-toluenesulfonyl)-decane was heated slowly to 200° C., and the mixture was maintained at that temperature for three hours. Thereafter, the reaction mass was allowed to cool and was then comminuted, washed thoroughly with acetone and ether, and recrystallized from a mixture of equal parts of methanol and ethanol. 2.8 gm. (31% of theory) of N,N'-decyl-1,10 - bis - (1,2,3,4 - tetrahydro-9-amino-acridinium) di-p-toluenesulfonate, M.P. 295–297° C. (decomposition), were obtained.

EXAMPLE 24

Preparation of N,N'-dodecyl-1,12-bis-(1,2,3,4-tetrahydro-9-amino-acridinium) diiodide by Method B A solution of 4 gm. of 1,2,3,4-tetrahydro-9-amino-acridine and 4.22 gm. of 1,12-diiodo-dodecane in 100 cc.

of methyl ethyl ketone was refluxed for 200 hours. Thereafter, the precipitate formed during that time was collected, dissolved in methanol and reprecipitated with ether. 3.6 gm. (43% of theory) of N,N'-dodecyl-1,12-bis-(1,2,3,4-tetrahydro-9-amino-acridinium) diiodide, M.P. 290–295° C. (decomposition), were obtained.

EXAMPLE 25

Preparation of N,N'-hexadecyl-1,16-bis-(1,2,3,4-tetrahydro-9-amino-acridinium) diiodide by Method B A solution of 4 gm. of 1,2,3,4-tetrahydro-9-aminoacridine and 4.78 gm. of 1,16-diiode-hexadecane in 100 cc. of methyl ethyl ketone was refluxed for 160 hours. Thereafter, the precipitate formed during that time was collected and recrystallized from aqueous ethanol. 3.5 gm. (40% of theory) of N,N'-hexadecyl-1,16-bis-(1,2,3,4-tetrahydro-9-amino-acridinium) diiodide, M.P. 285–290° C. (decomposition), were obtained.

The compounds according to the present invention, that is, those embraced by Formula I above, have useful pharmacodynamic properties. More particularly, they exhibit highly effective bacteriostatic and fungistatic activities in warm-blooded animals; they are especially effective against *Staphylococcus aureus* SG 511, *Bacillus subtilis* ATCC 9524, *Escherichia coli* ATCC 9637, *Pseudomonas aeruginosa* ATCC 10145, *Aspergillus niger* 72/4, *Corynebacterium diphteriae* ATCC 11913, *Clostridium acetobutylicum* ATCC 10132. Mainly the compounds wherein R means hydrogen are bactericidal and fungicidal effective. By virtue of these properties the compounds of the present invention are particularly useful for treating external burns, external mycoses and infections of the mouth and throat in warm-blooded animals.

For pharmaceutical purposes the compounds according to the present invention are administered topically to the area affected by the bacterial or fungal growth in warm-blooded animals, for instance as active ingredients in customary pharmaceutical compositions adapted for topical administration consisting essentially of an inert carrier and a bacteriostatically or fungistatically or bactericidally or fungicidally effective amount of the active ingredient. Examples of such pharmaceutical compositions include, but are not limited to, aerosols, lozenges, ointments, jellies, tinctures and the like. The bacteriostatically or fungistatically effective concentration of the compounds according to the invention in such compositions is from 0.005 to 10% by weight, based on the total weight of the composition. More particularly, the range of effective concentration for aerosols is 0.01 to 5.0%, preferably 0.05 to 3%; for ointments, jellies and tinctures it is 0.005 to 10%, preferably 0.05 to 2.0%; and for lozenges it is 0.05 to 50 mgm., preferably 0.1 to 5.0 mgm.

The following examples illustrate a few pharmaceutical compositions adapted for topical administration comprising a compound of the present invention as an active ingredient. The parts are parts by weight unless otherwise specified.

EXAMPLE 26

Aerosol spray

The aerosol composition is compounded from the following ingredients:

| | Parts |
|---|---|
| N-decyl-1,2,3,4-tetrahydro-9-amino-acridinium bromide | 0.2 |
| Ethanol, 90% | 9.8 |
| Difluorodichloromethane | 5.0 |
| Tetrafluorodichloroethane | 5.0 |

The ingredients are admixed in the manner customary for aerosol manufacture, and the mixture is filled into aerosol spray cans under deep refrigeration or pressure.

EXAMPLE 27

Lozenges

The lozenge composition is compounded from the following ingredients:

| | Parts |
|---|---|
| N,N'-decyl-1,10-bis-(1,2,3,4-tetrahydro-9-amino-acridinium) dibromide | 0.5 |
| Glucose | 400.0 |
| Confectioner's sugar | 184.5 |
| Stearic acid | 15.0 |
| Total | 600.0 |

The ingredients are intimately admixed with each other, and the mixture is pressed into 600 mgm. lozenges. Each lozenge contains 0.5 mgm. of the acridinium compound.

EXAMPLE 28

Ointment

The ointment composition is compounded from the following ingredients:

| | Parts |
|---|---|
| N-decyl-1,2,3,4-tetrahydro-9-amino-acridinium isethionate | 0.1 |
| Wool grease alcohols | 0.1 |
| Yellow vaseline | 5.0 |
| Hard paraffin | 12.0 |
| High viscosity paraffin | 30.0 |
| Distilled or demineralized water, q.s. ad. 100.00. | |

The ingredients are intimately admixed with each other and the mixture is homogenized; as customary in ointment manufacture.

Although the above composition examples illustrate only three specific compounds of the generic class of compounds according to the present invention, it should be understood that any other compound embraced by Formula I may be used in place of the particular compounds illustrated in Examples 26 through 28 above. Moreover, the amount of active ingredient in these examples may be varied within the effective concentration range set forth above, and the amounts and nature of the inert carrier ingredients may be varied to meet particular requirements.

While the present invention has been illustrated with the aid of certain specific embodiment thereof, it will be readily apparent to others skilled in the art that the instant invention is not limited to these particular embodiments, and that various changes and modifications may be made without departing from the spirit of the invention or the scope of the appended claims.

We claim:

1. A compound of the formula

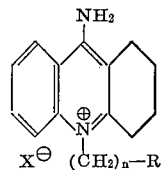

wherein:
$n$ is an integer from 8 to 16, inclusive,
R is hydrogen or

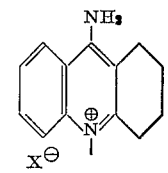

and

X is the biologically acceptable anion of an inorganic or organic acid.

2. A compound as in claim 1, wherein X is the anion of a mineral acid, acetic acid, propionic acid, caproic acid, tartaric acid, fumaric acid, maleic acid, citric acid methanesulfonic acid or p-toluenesulfonic acid.

3. A compound of the formula

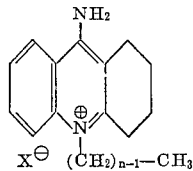

wherein:
n is an integer from 8 to 16, inclusive, and
X is the biologically acceptable anion of an inorganic or organic acid.

4. A compound of the formula

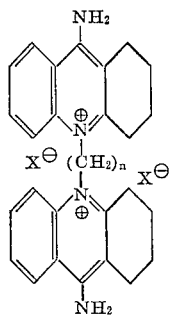

wherein:
n is an integer from 8 to 16, inclusive, and
X is the biologically acceptable anion of an inorganic or organic acid.

5. A compound as in claim 3, wherein $n$ is 8 and X is the chloride anion.

6. A compound as in claim 3, wherein $n$ is 8 and X is the bromide anion.

7. A compound as in claim 3, wherein $n$ is 10 and X is the bromide anion.

8. A compound as in claim 3, wherein $n$ is 10 and X is the isethionate anion.

9. A compound as in claim 3, wherein $n$ is 12 and X is the chloride anion.

10. A compound as in claim 3, wherein $n$ is 12 and X is the bromide anion.

11. A compound as in claim 3, wherein $n$ is 12 and X is the acetate anion.

12. A compound as in claim 4, wherein $n$ is 10 and X is the chloride anion.

13. A compound as in claim 4, wherein $n$ is 10 and X is the bromide anion.

14. A compound as in claim 4, wherein $n$ is 10 and X is the iodide anion.

15. A compound as in claim 4, wherein $n$ is 10 and X is the acetate anion.

References Cited

UNITED STATES PATENTS

| | | | |
|---|---|---|---|
| 2,152,047 | 3/1939 | Hahl et al. | 260—286 X |
| 2,295,504 | 9/1942 | Shelton | 260—286 X |
| 3,075,981 | 1/1963 | Surrey | 260—286 X |
| 3,346,579 | 10/1967 | Sheehan | 260—279 |
| 2,108,765 | 2/1938 | Domagk | 260—567.6 X |
| 2,485,162 | 10/1949 | Parham | 260—279 |
| 2,791,582 | 5/1957 | Austin et al. | 260—286 |
| 2,791,588 | 5/1957 | Collier et al. | 260—286 |
| 2,948,728 | 8/1960 | Rudner et al. | 260—279 |
| 3,027,378 | 3/1962 | Stark | 260—286 |
| 3,066,141 | 11/1962 | Jones et al. | 260—279 |
| 3,147,182 | 9/1964 | Masci et al. | 260—286 X |
| 3,232,945 | 2/1966 | Sigal et al. | 260—279 X |

OTHER REFERENCES

Ferguson et al. Jour. Pharmacolog., vol. 86, pp. 258–63 (1946), abstracted in Chem. Abstr., vol. 40, col. 3496 (1946).

Albert: "The Acridines," Arnold, 1951, pages 207, 261 and 301.

DONALD G. DAUS, Primary Examiner

U.S. Cl. X.R.

260—456, 558, 586, 649, 652; 424—232, 257